US010443650B2

United States Patent
Smith et al.

(10) Patent No.: US 10,443,650 B2
(45) Date of Patent: Oct. 15, 2019

(54) TWO PART SEAL ASSEMBLY FOR A TRACK ROLLER BEARING

(71) Applicant: Roller Bearing Company of America, Inc., Oxford, CT (US)

(72) Inventors: Phil Smith, Torrington, CT (US); Curtis Swartley, Torrington, CT (US); Nolan Richard, Cheshire, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 15/952,897

(22) Filed: Apr. 13, 2018

(65) Prior Publication Data

US 2018/0298942 A1 Oct. 18, 2018

Related U.S. Application Data

(60) Provisional application No. 62/484,966, filed on Apr. 13, 2017.

(51) Int. Cl.
*F16C 33/76* (2006.01)
*F16C 19/16* (2006.01)
(Continued)

(52) U.S. Cl.
CPC ............ *F16C 19/16* (2013.01); *F16C 13/006* (2013.01); *F16C 19/06* (2013.01); *F16C 33/60* (2013.01);
(Continued)

(58) Field of Classification Search
CPC ........ F16C 13/006; F16C 19/44; F16C 19/46; F16C 19/463; F16C 19/466; F16C 19/48;
(Continued)

(56) References Cited

U.S. PATENT DOCUMENTS 2,274,137 A * 2/1942 Frauenthal .............. F16C 19/46
277/562
2,355,818 A * 8/1944 Potter ..................... F16C 19/46
384/561
(Continued)

FOREIGN PATENT DOCUMENTS

DE 19626864 A1 1/1998
DE 10024529 A1 7/2001
(Continued)

OTHER PUBLICATIONS

Extended European Search Report issued in corresponding EP Application No. 18167181.9, dated Jul. 2, 2018, pp. 1-6.

*Primary Examiner* — Phillip A Johnson
(74) *Attorney, Agent, or Firm* — Murtha Cullina LLP (57) ABSTRACT

A seal assembly for a bearing includes an inner seal member that has an annular ring with a first lobe extending therefrom and a seal receiving surface on a leg extending axially from the annular ring. The seal receiving surface has two seating areas. The seal assembly includes an outer seal member positioned radially inward from the leg and axially outward from the annular ring. The outer seal member has a pivot member which has a second lobe extending outwardly therefrom. The seal assembly includes a retaining ring that has a circumferential groove formed therein. The pivot member is pivotally seated in the groove so that the second lobe is moveable between the two first seating areas.

19 Claims, 6 Drawing Sheets

(51) Int. Cl.
*F16C 19/06* (2006.01)
*F16C 33/60* (2006.01)
*F16C 33/78* (2006.01)
*F16C 13/00* (2006.01)

(52) U.S. Cl.
CPC ...... *F16C 33/7879* (2013.01); *F16C 33/7896* (2013.01); *F16C 2300/02* (2013.01)

(58) Field of Classification Search
CPC .............. F16C 33/7809; F16C 33/7863; F16C 33/7879; F16C 33/7896
See application file for complete search history.

(56) References Cited

U.S. PATENT DOCUMENTS

| | | | |
|---|---|---|---|
| 2,838,349 A * | 6/1958 | Maas | F16C 19/46 16/180 G |
| 3,266,856 A * | 8/1966 | Steinert et al. | F16C 33/7809 384/484 |
| 3,622,165 A | 11/1971 | Hatch | |
| 3,752,543 A | 8/1973 | Schmidt | |
| 4,309,063 A | 1/1982 | Weis | |
| 4,685,184 A | 8/1987 | Satkamp | |
| 5,286,115 A | 2/1994 | Toji et al. | |
| 8,246,253 B2 | 8/2012 | Masui et al. | |
| 8,985,590 B2 | 3/2015 | Liang et al. | |
| 9,302,722 B2 | 4/2016 | Liang et al. | |
| 9,656,707 B2 | 5/2017 | Johannsen | |
| 9,908,572 B2 | 3/2018 | Brooks et al. | |
| 2001/0019194 A1 * | 9/2001 | Weiss | F16C 13/006 277/551 |
| 2002/0070504 A1 | 6/2002 | Neubert et al. | |
| 2003/0210840 A1 | 11/2003 | Ogawa | |
| 2012/0146397 A1 | 6/2012 | Hisamatsu | |
| 2012/0193976 A1 | 8/2012 | Diekevers et al. | |
| 2015/0013420 A1 | 1/2015 | Shibutani et al. | |
| 2016/0068204 A1 | 3/2016 | Rathod | |
| 2016/0176454 A1 | 7/2016 | Diekevers et al. | |
| 2016/0290400 A1 | 10/2016 | Shoji et al. | |
| 2017/0190367 A1 | 7/2017 | Thorson et al. | |
| 2017/0369111 A1 | 12/2017 | Recker | |

FOREIGN PATENT DOCUMENTS

| | | |
|---|---|---|
| EP | 1217236 A2 | 6/2002 |
| WO | 2013013005 A1 | 1/2013 |
| WO | 2014131384 A1 | 9/2014 |
| WO | 2014176253 A1 | 10/2014 |
| WO | 2015031289 A1 | 3/2015 |
| WO | 2017103183 A2 | 6/2017 |

* cited by examiner

TWO PART SEAL ASSEMBLY FOR A TRACK ROLLER BEARING

CROSS REFERENCE TO RELATED APPLICATION

The instant application is a non-provisional of, and claims priority benefit to, U.S. Provisional Patent Application No. 62/484,966, entitled "TWO PART SEAL ASSEMBLY FOR A TRACK ROLLER BEARING," filed on Apr. 13, 2017, the entirety of which is incorporated by reference herein.

TECHNICAL FIELD

The present invention is directed to a low friction two-part seal assembly for a track roller bearing that precludes the need to replenish grease over the life of the bearing, and more particularly to a two-part seal that includes a pivot member that is moveable within the assembly.

BACKGROUND

Seals are generally employed to prevent ingress of contamination and debris into spaces between moving parts of various machines and structures. For example, seals are employed to prevent the ingress of debris into a space between an inner member and an outer member of a bearing in which the inner member and/or outer member rotate and/or misalign relative to one another. One type of bearing is a track roller bearing that typically includes an inner member positioned for rotational movement in an outer race. The inner member defines an outer surface, and the outer race defines an inner surface. A plurality of rolling elements such as needle rollers are disposed in a cavity formed between the outer surface of the inner member and the inner surface of the outer race. Contamination of the rolling elements, the outer surface of the inner member and the inner surface of the outer race, is one of the leading causes of bearing damage. Typically, the track roller bearing assemblies includes a sealing arrangement on opposing sides thereof, wherein a seal has opposing ends disposed in a groove on each of the inner member and the outer race. The seal aids in retaining a lubricant, such as grease, between the cavity and for inhibiting the ingress of dirt, water, particulate matter, and other contaminants to the sliding engagement surfaces.

In some instances, the seal does not adequately retain the grease in the bearing. As a result, grease leaks out of the bearing contaminating adjacent structures and depleting the grease in the bearing. Such depletion of the grease can cause the bearing to prematurely fail. Accordingly, some bearings are provided with grease replenishment systems to periodically add grease to the bearing. For example, grease replenishment systems in track roller bearings typically include passages (e.g., holes) that extend through the inner member and communicate with the cavity and rolling elements between the inner member and the outer race via one or more grooves formed in the inner surface of the outer race and/or the outer surface of the inner member. Grease can be provided to the grease replenishment systems via manual hand held devices or via an automatic intermittent pressurized supply of grease. In some instances the replenishment of the grease disturbs the preferred configuration of the seal, which can result in seal failure and the leakage of grease from the bearing. In certain aircraft bearing applications, such as bearings located in leading or trailing control surfaces in aircraft wings, lubrication systems cannot be employed due to space and weight constraints.

Based on the foregoing, there is a need to provide a bearing with a seal that retains grease in the bearing over the entire life of the bearing and to prevent the bearing from being improperly charged with grease.

SUMMARY

There is disclosed herein a seal assembly for a bearing that includes an inner seal member that has an annular ring which as an axially inward facing surface and an axially outward facing surface. The annular ring has a first lobe extending outwardly from a radially outermost portion of the annular ring. The annular ring has a leg extending axially outward from the axially outward facing surface, proximate the first lobe. A seal receiving surface extends along a portion of the axially outward facing surface and along a radially inward facing surface of the leg. The seal receiving surface has a first seating area and a second seating area. The seal assembly includes an outer seal member positioned radially inward from the leg and axially outward from the axially outward facing surface of the annular ring. The outer seal member includes a pivot member that has a second lobe which extends outwardly therefrom. The seal assembly includes a retaining ring which as a circumferential groove formed therein. The retaining ring is positioned axially outward of the annular ring and radially inward from the leg. The pivot member is pivotally seated in the groove so that the second lobe is moveable between the first seating area and the second seating area.

In one embodiment, the seal receiving surface has an arcuate segment. In one embodiment, the first lobe has a biasing property that is configured to align the annular ring in the bearing. In one embodiment, a portion of the retaining ring and a portion of the axially outward facing surface are in rotational sliding engagement with one another. In one embodiment, the second lobe is in rotational sliding engagement with a portion of the seal receiving surface. In one embodiment, a portion of the pivot member is in rotational sliding engagement with the groove. In one embodiment, the inner seal member and/or the outer seal member are manufactured from a plastic material.

There is further disclosed herein a track roller bearing that includes an inner race which has an outer surface that extends between a first axial end and a second axial end of the inner race. The outer surface extends circumferentially around the inner race. The bearing includes an outer race which has an inner surface which extends between a third axial end and a fourth axial end of the outer race. The inner surface extends circumferentially in the outer race. The inner race is positioned coaxially in the outer race such that a cavity is formed between the outer surface and the inner surface. A plurality of rolling elements disposed in the cavity and in rolling engagement with a portion of the inner surface and the outer surface. A seal assembly is secured to a portion of the outer race. The seal assembly includes an inner seal member that has an annular ring which has an axially inward facing surface and an axially outward facing surface. The annular ring has a first lobe extending outwardly from a radially outermost portion of the annular ring. The annular ring has a leg which extends axially outward from the axially outward facing surface, proximate the first lobe. A seal receiving surface extends along a portion of the axially outward facing surface and along a radially inward facing surface of the leg. The seal receiving surface has a first seating area and a second seating area. The seal assembly includes an outer seal member positioned radially inward from the leg and axially outward from the axially outward facing surface of the annular ring. The outer seal member includes a pivot member which has a second lobe that extends outwardly therefrom. The seal assembly includes a retaining ring which has a circumferential groove formed therein. The retaining ring is positioned axially outward of the annular ring and radially inward from the leg. The pivot member is pivotally seated in the groove so that the second lobe is moveable between the first seating area and the second seating area.

In one embodiment, the retaining ring is configured to rotate with the inner race. In one embodiment, the bearing includes at least one barrier for preventing introduction of a lubricant into the cavity when the track roller bearing is assembled. In one embodiment, the barrier includes the outer surface which extends continuously between the first axial end and the second axial end of the inner race and the outer surface which extends circumferentially around the inner race; and the inner surface which extends continuously between the third axial end and the fourth axial end of the outer race and the inner surface which extends continuously circumferentially in the outer race, without any holes, penetrations or conduits extending through the inner race or outer race and without any other path for the introduction of a lubricant into the cavity after the bearing is fully assembled.

In one embodiment, the third axial end and the fourth axial end of the outer race includes a radially inward facing groove in which the first lobe is seated such that the axially inward facing surface of the inner seal member frictionally engages the respective one of opposing axial faces of the outer race.

In one embodiment, the third axial end and the fourth axial end of the outer race includes a radially inward facing lip that engages a radially outward facing surface of the leg of the inner seal member to maintain a continuous circumferential engagement of the radially inward facing surface of the leg with the second lobe.

In one embodiment, the seal receiving area has an arcuate segment. In one embodiment, the first lobe has a biasing property that is configured to align the annular ring in the bearing. In one embodiment, a portion of the retaining ring and a portion of the axially outward facing surface are in rotational sliding engagement with one another. In one embodiment, the second lobe is in rotational sliding engagement with a portion of the seal receiving surface. In one embodiment, a portion of the pivot member is in rotational sliding engagement with the groove. In one embodiment, the inner seal member and/or the outer seal member are manufactured from a plastic material.

There is further disclosed herein a track roller bearing that has one or more barriers for preventing introduction of a lubricant into the cavity when the track roller bearing is assembled. In one embodiment, the barrier includes the outer surface extends continuously between the first axial end and the second axial end of the inner race and the outer surface extends circumferentially around the inner race; and the inner surface extends continuously between the third axial end and the fourth axial end of the outer race and the inner surface extends continuously circumferentially in the outer race.

DETAILED DESCRIPTION

Figure 1:
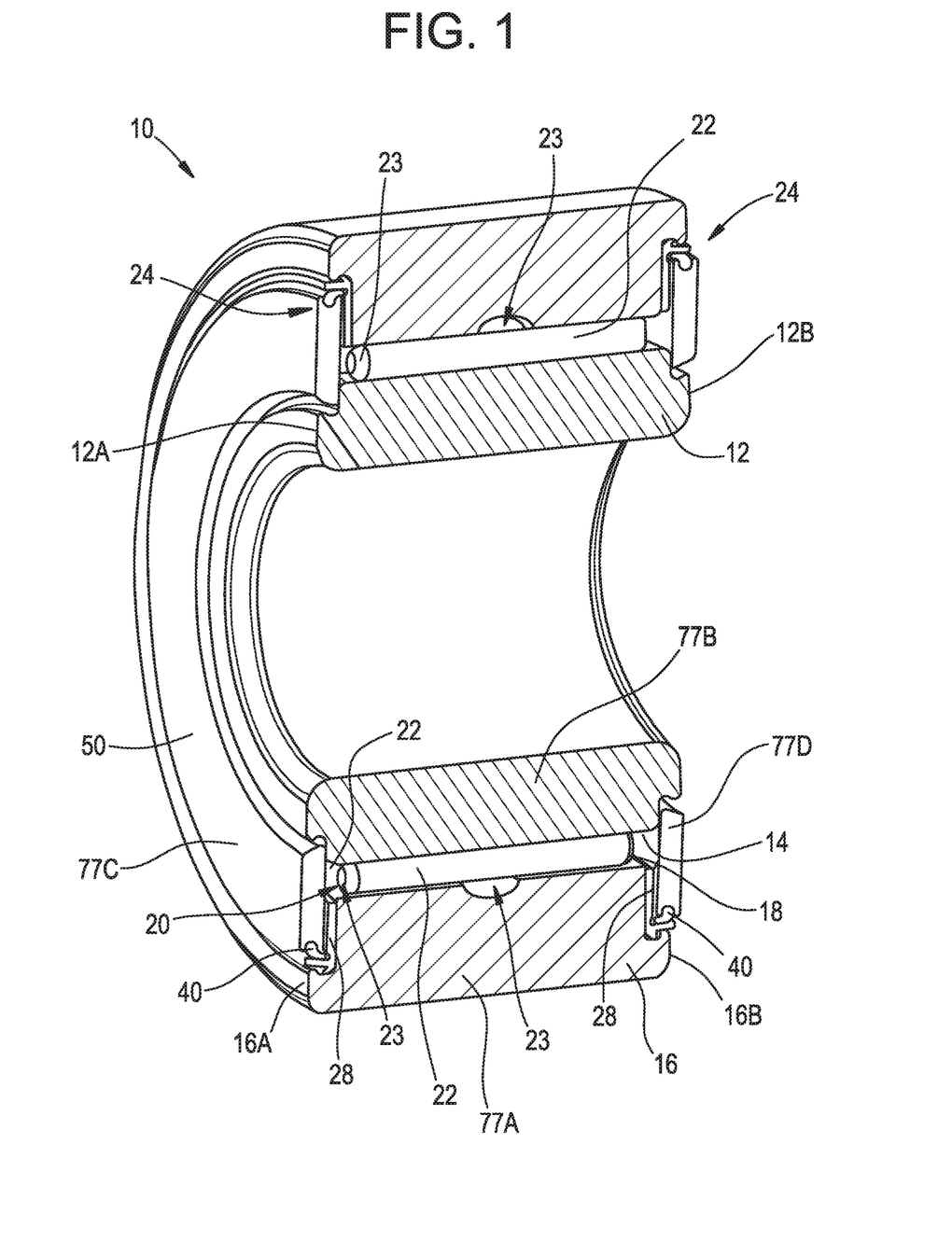
FIG. 1 is a cross sectional view of the seal assembly of the present invention shown installed in a single row track roller bearing.
Figure 2:
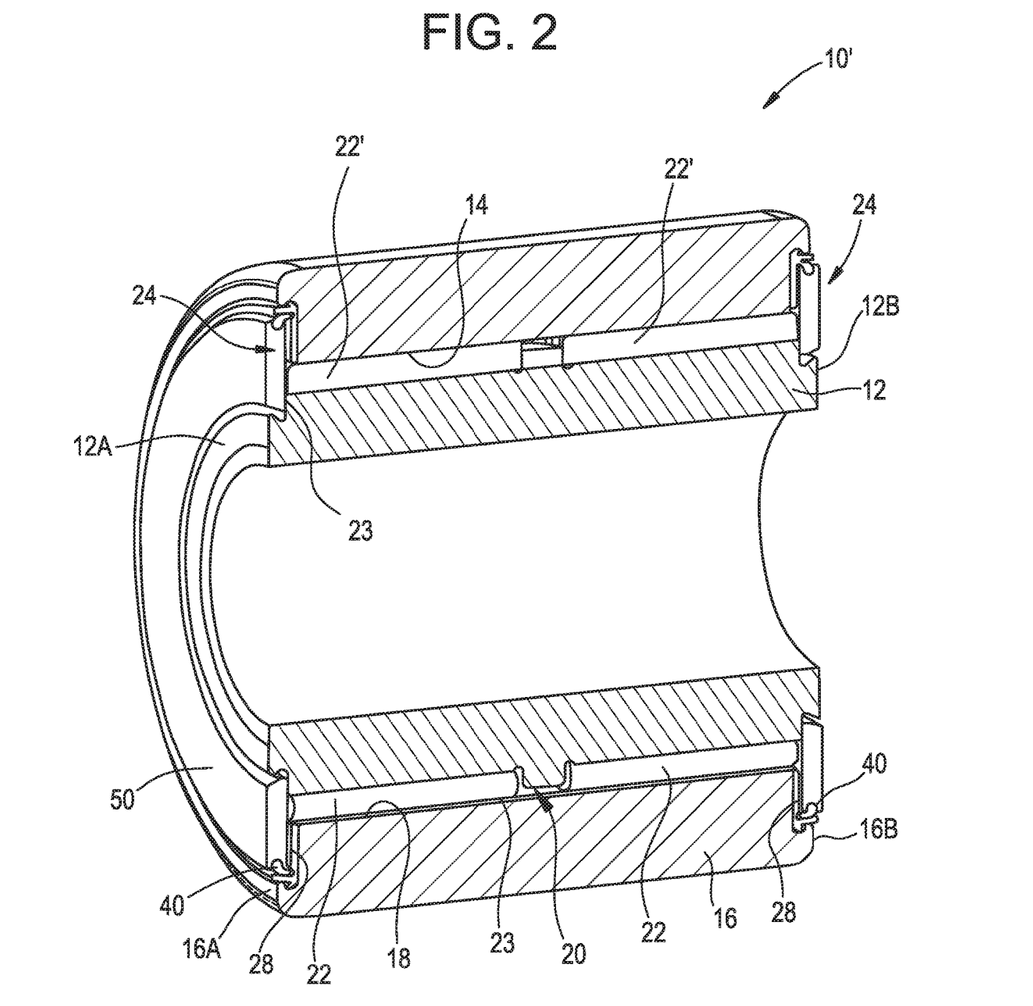
FIG. 2 is a cross sectional view of the seal assembly of the present invention shown installed in a double row track roller bearing.

As shown in FIG. 1, a single row track roller bearing is generally designated by the numeral 10. The track roller bearing 10 includes an inner race 12 that has an outer surface 14 extending between a first axial end 12A and a second axial end 12B of the inner race 12. The outer surface 14 extends circumferentially around the inner race 12. The track roller bearing 10 includes an outer race 16 that has an inner surface 18 that extends between a third axial end 16A and a fourth axial end 16B of the outer race 16. The inner surface 18 extends circumferentially in the outer race 16. The inner race 12 is positioned coaxially in the outer race 16 such that a cavity 20 is formed between the outer surface 14 and the inner surface 18. A single row of a plurality of rolling elements 22 (e.g., needle rollers) are disposed in the cavity 20. The rolling elements 22 are in rolling engagement with a portion of the inner surface 18 and the outer surface 14. The cavity 20 is initially filled with a lubricant 23 (e.g., grease) prior to final assembly. After final assembly and during the operating life of the bearing 10, no additional lubricant 23 is supplied to the bearing. While a single row of the plurality of rolling elements 22 (e.g., needle rollers) are shown in FIG. 1 as being disposed in the cavity 20, the present invention is not limited in this regard as more than one row of rolling elements may be employed, for example two rows of the plurality of rolling elements 22' (e.g., needle rollers) are disposed in the cavity 20 as shown in FIG. 2.

Figure 3:
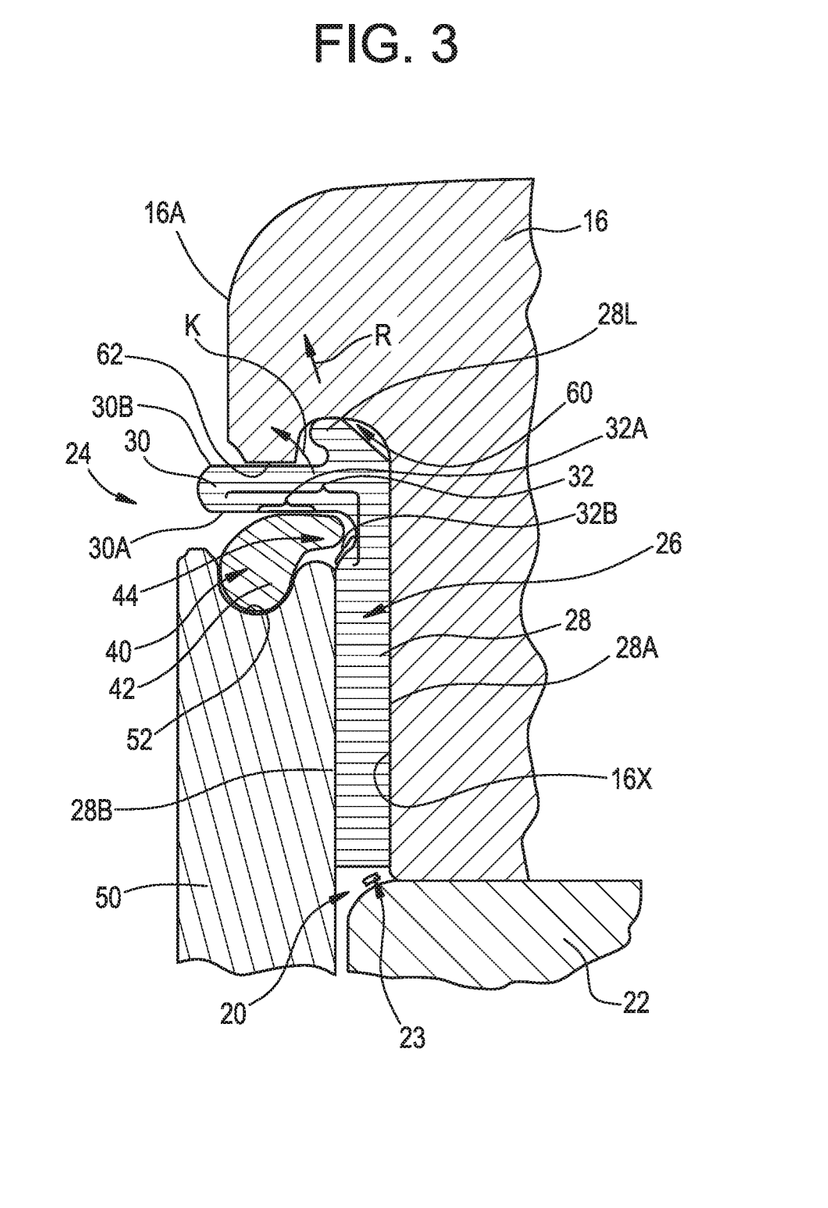
FIG. 3 is an enlarged view of a portion of the seal assembly of detail 3 of FIG. 1 shown in a grease retention configuration.

As best shown in FIG. 3, a seal assembly 24 is secured to a portion of the outer race 16, as described herein. The seal assembly 24 includes an inner seal member 26 that has an annular ring 28 that has an axially inward facing (i.e., facing towards the outer race) surface 28A and an axially outward facing (i.e., facing away from the outer race) surface 28B. The annular ring 28 has a first lobe 28L extending outwardly (i.e., in the direction generally indicated by the arrow R) from a radially outermost portion of the annular ring 28. The annular ring 28 has a leg 30 that extends axially outward from the axially outward facing surface 28B, proximate the first lobe 28L. A seal receiving surface 32 extends along a portion of the axially outward facing surface 28B and along a radially inward facing surface 30A of the leg 30. The seal receiving surface 32 has a first seating area 32A and a second seating area 32B, as described herein. In one embodiment, a portion of the seal receiving surface 32 has an arcuate segment.

As shown in FIG. 3, the seal assembly 24 includes an outer seal member 40 positioned radially inward from the leg 30 and axially outward from the axially outward facing surface 28B of the annular ring 28. The outer seal member 40 includes a pivot member 42 (e.g., a bulbous or spherical body) that has a second lobe 44 extending outwardly therefrom. In one embodiment, the second lobe 44 is formed integrally with the pivot member 42. The seal assembly 24 includes a retaining ring 50 that has a circumferential groove 52 formed in a radially outer edge thereof. The retaining ring 50 is positioned axially outward of the annular ring 28 and radially inward from the leg 30. The retaining ring 50 is configured to rotate with the inner race 16. For example, the retaining ring 50 is clamped between housing spars (i.e., main longitudinal beam of an airplane wing, not shown in the figures). The retaining ring 50 axially contains the rolling elements 22. A portion of the retaining ring 50 and a portion of the axially outward facing surface 28B are in rotational sliding engagement with one another.

Figure 4:
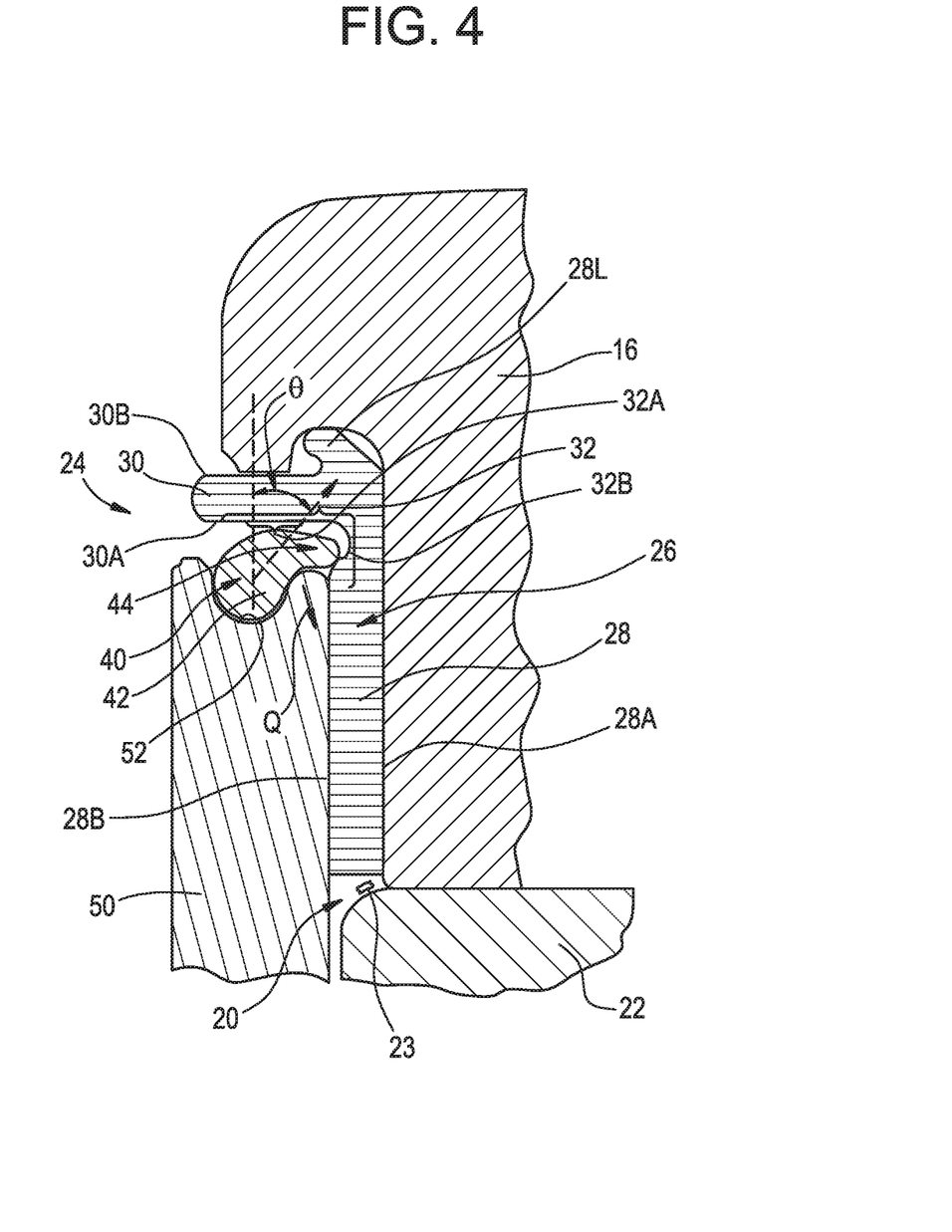
FIG. 4 is an enlarged view of a portion of the seal assembly of detail 3 of FIG. 1 shown in a debris blocking configuration.

As shown in FIG. 3, the pivot member 42 is pivotally seated in the groove 52 so that the second lobe 44 is moveable between the first seating area 32A and the second seating area 32B. Referring now to FIG. 4, in one embodiment, the second lobe 44 extends outwardly at an angle Θ. As the pivot member 42 pivots within the groove 52, the angle Θ changes. In one embodiment, the angle Θ has a range from 0 to 90 degrees, 10 to 90, 10 to 75 degrees, 20 to 65 degrees, or 30 to 50 degrees. Referring again to FIG. 3, the pivot member 42 and the groove 52 extend circumferentially around the retaining ring 50 and have a circular cross section. In one embodiment, the pivot member 42 has a partially circular cross section (e.g. from 300 to 340 degrees, 300 to 360 degrees, or 280 to 340 degrees therearound and with the second lobe 44 expanding therefrom). The pivot member 42 and the groove 52 slidingly engage at abutting surfaces having a radius of curvature. The abutting surfaces of these components are substantially complementary and uniform so as to provide minimal resistance to rotation of the outer seal member 40 within the groove 52. In one embodiment, the pivot member 42 has a range of rotation from 120 to 180 degrees, 90 to 120 degrees, 45 to 90 degrees, 20 to 45 degrees, or 10 to 20 degrees. In one embodiment, the abutting surfaces of the outer seal member 40 and the groove 52 have a substantially constant radius of curvature. For example, as shown in FIG. 3 a portion of the second lobe 44 is sealingly seated on the first seating area 32A to prevent the escape of a lubricant 23 from the cavity. As shown in FIG. 3, the pivot member 42 pivots (e.g., rotates) in the groove 52 so that the second lobe 44 is rotated in the direction of the arrow K so that a portion of the second lobe 44 sealingly engages and seats on the first seating area 32A, while the first seating area 32A pushes back on the second lobe 44. The seal body 40 pivots in reaction of these forces, functioning similarly to a conical spring, so that physical contact with the groove 52 and first seating area 32A is maintained without inducing excessive torque due to tolerance stack-ups. If pressure external to the cavity 20 is less than the pressure in the cavity 20, a portion of the second lobe 44 will seat on the first seating area 32A.

As shown in FIG. 4, the pivot member 42 pivots (e.g., rotates) in the groove 52 so that a portion of the second lobe 44 sealingly engages and seats on the second seating area 32B to prevent debris from entering the cavity 20 and to maintain the lubricant 23 in the cavity. As shown in FIG. 4, the pivot member 42 pivots (e.g., rotates) in the groove 52 so that the second lobe 44 is rotated in the direction of the arrow Q so that a portion of the second lobe 44 sealingly engages and seats on the second seating area 32B. If pressure external to the cavity 20 exceeds the pressure in the cavity 20, a portion of the second lobe 44 will seat on the second seating area 32B.

Figure 6:
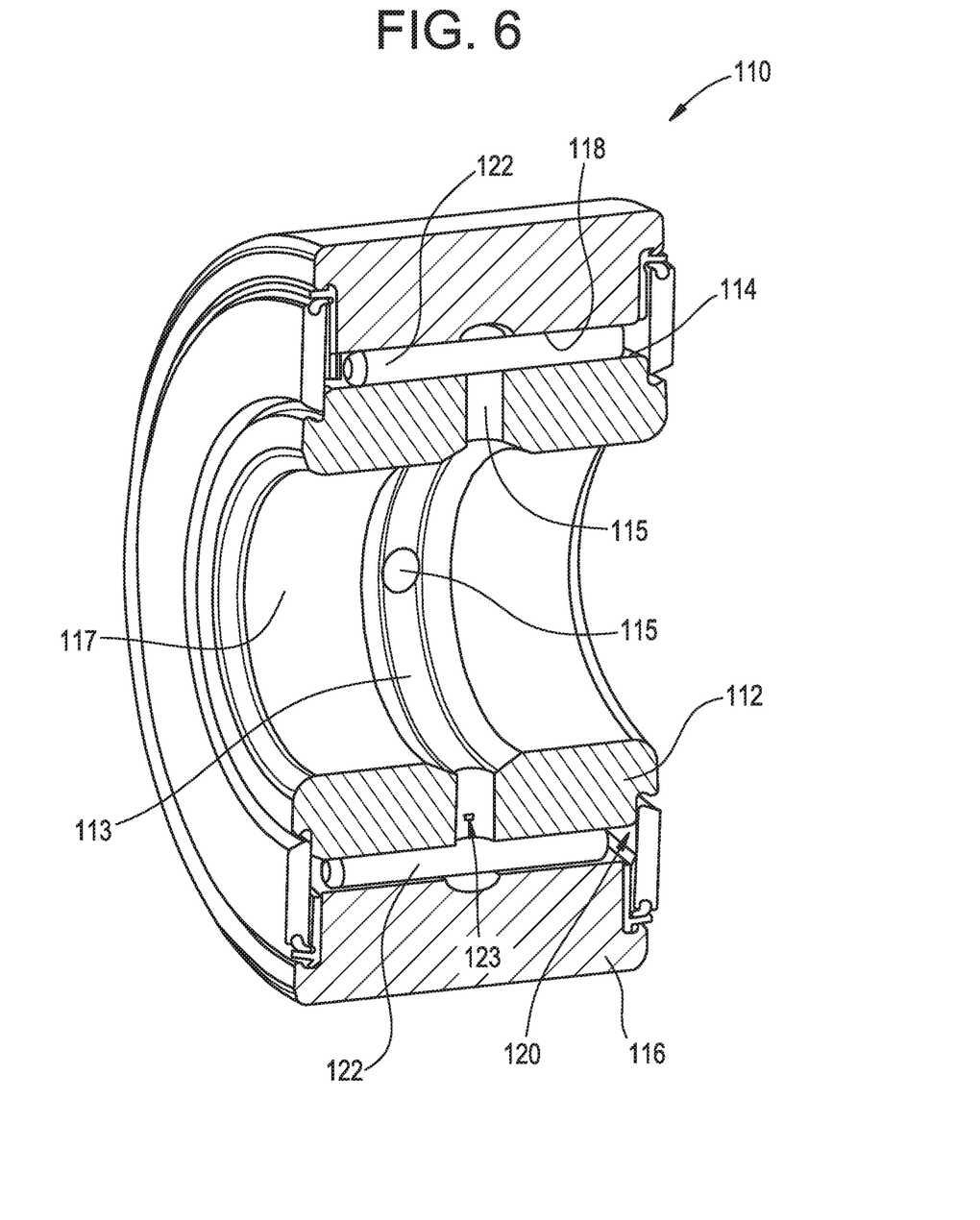
FIG. 6 is a cross sectional view of the seal assembly of the present invention shown installed in a double row track bearing having a grease replenishment system therein.

As shown in FIGS. 1 and 2, the track roller bearing 10 has barriers 77A, 77B, 77C and 77D for preventing introduction of a lubricant into the cavity when the track roller bearing is fully assembled (e.g., during the operating life of the bearing 10). For example, the barrier 77B includes the outer surface 14 of the inner race 12 which extends continuously between the first axial end 12A and the second axial end 12B of the inner race 12 and the outer surface 14 extends circumferentially around the inner race 12, without any holes, passages or conduits for the supply or introduction of a lubricant to the cavity 20. The barrier 77A includes the inner surface 18 of the outer race 16 which extends continuously between the third axial 16A end and the fourth axial end 16B of the outer race 16 and the inner surface 18 extends continuously circumferentially in the outer race 16, without any holes, passages or conduits for the supply or introduction of a lubricant to the cavity 20. The retaining rings 50 are also barriers 77C and 77D because the retaining rings 50 have no holes, passages or conduits for the supply or introduction of a lubricant to the cavity 20. The barriers 77A, 77B, 77C and 77D prevent the introduction of the lubricant 23 into the cavity 20 after the bearing 10 is assembled to prevent over pressurization of the cavity 20. In contrast, FIG. 6 illustrates a track roller bearing 110 that has holes 115 in the inner race 112 that communicate with a groove 113 formed on the inner surface 117 of the inner race 112. The holes 115 provide a path for the introduction of the lubricant 123 into the cavity 120. The track roller bearing 110 has an outer race 116 that surrounds the inner race 112. The track roller bearing having the barriers 77A, 77B, 77C and 77D for preventing introduction of a lubricant into the cavity when the track roller bearing is fully assembled, may employ the seal 24 or other seal designs.

Figure 5:
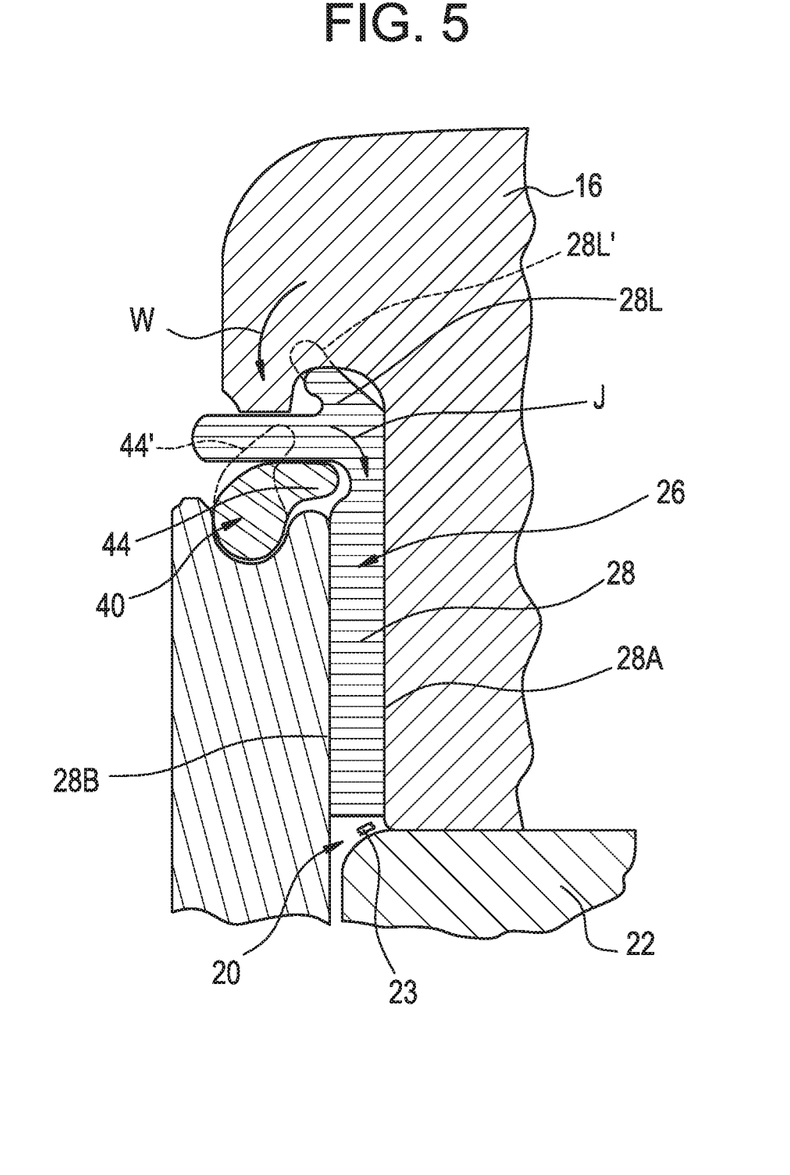
FIG. 5 is view of the seal assembly of FIG. 3 showing portions of the seal in a relaxed state.

As shown in FIG. 3, the outer race 16 includes a radially inward facing groove 60 adjacent to the third axial end 16A of the outer race 16, in which the first lobe 28L is seated such that a moment is applied to the inner seal member 26 and so that the axially inward facing surface 28A of the inner seal member 26 frictionally engages an axial face 16X of the outer race 16. Referring to FIG. 5, the first lobe 28L has a biasing property that is configured to align the annular ring 28 in the bearing 10. The first lobe 28L' is shown in a relaxed state in dashed lines. During installation, the first lobe 28L is biased in the direction of the arrow W so that the axially inward facing surface 28B of the inner seal member 26 frictionally engages the axial face 16X of the outer race 16. The fourth axial end 16B of the outer race 16 is configured similar to the third axial end 16A.

As shown in FIG. 3, a radially inward facing lip 62 extends from the third axial end 16A to the groove 60. The lip 62 engages a radially outward facing surface 30B of the leg 30 of the inner seal member 26 to maintain a continuous circumferential engagement of the radially inward facing surface 30A of the leg 30 with a portion of the second lobe 44. As shown in FIG. 5, the second lobe 44' is shown in a relaxed state as indicated by the dashed lines. During installation, the second lobe 44 is compressed in the direction of the arrow J to maintain a continuous circumferential engagement of the radially inward facing surface 30A of the leg 30 with a portion of the second lobe 44. The second lobe 44 is in rotational sliding engagement with a portion of the seal receiving surface 32. A portion of the pivot member 42 is in rotational sliding engagement with the groove 52.

The inner seal member 26 and the outer seal member 40 are manufactured from a plastic material. For example, in one embodiment, the inner seal member is manufactured from an acetal polyoxymethylene (POM) copolymer with lubricant fillers, which configures the axial inward surface 28A f the inner seal member 26 to withstand thrust loads from the retaining ring 50 and frictionally engaged the axial face 16X of the outer race 16; and to provide low friction (e.g., so that the break-away or starting torque of the bearing 10 is less than 0.55 N-m or 5 in-lbs) rotational sliding engagement between the portion of the retaining ring 50 and a portion of the axially outward facing surface 28B. In one embodiment, the outer seal member 40 is manufactured from a thermoplastic copolyester (TPC) or a thermoplastic elastomer (TPC-ET).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A seal assembly for a bearing, the seal assembly comprising:
   an inner seal member comprising an annular ring having an axially inward facing surface and an axially outward facing surface, the annular ring having a first lobe extending outwardly from a radially outermost portion of the annular ring, the annular ring having a leg extending axially outward from the axially outward facing surface, proximate the first lobe, a seal receiving surface extending along a portion of the axially outward facing surface and along a radially inward facing surface of the leg, the seal receiving surface having a first seating area and a second seating area;
   an outer seal member positioned radially inward from the leg and axially outward from the axially outward facing surface of the annular ring, the outer seal member comprising a pivot member having a second lobe extending outwardly therefrom;
   a retaining ring having a circumferential groove formed therein, the retaining ring being positioned axially outward of the annular ring and radially inward from the leg; and
   the pivot member being pivotally seated in the groove so that the second lobe is moveable between the first seating area and the second seating area.

2. The seal assembly of claim 1, wherein the seal receiving surface comprises an arcuate segment.

3. The seal assembly of claim 1, wherein the first lobe comprises a biasing property that is configured to align the annular ring in the bearing.

4. The seal assembly of claim 1, wherein a portion of the retaining ring and a portion of the axially outward facing surface are in rotational sliding engagement with one another.

5. The seal assembly of claim 1, wherein the second lobe is in rotational sliding engagement with a portion of the seal receiving surface.

6. The seal assembly of claim 1, wherein a portion of the pivot member is in rotational sliding engagement with the groove.

7. The seal assembly of claim 1, wherein at least one of the inner seal member and the outer seal member comprises a plastic material.

8. A track roller bearing comprising:
   an inner race having an outer surface extending between a first axial end and a second axial end of the inner race and the outer surface extending circumferentially around the inner race;
   an outer race having an inner surface extending between a third axial end and a fourth axial end of the outer race and the inner surface extending circumferentially in the outer race;
   the inner race being positioned coaxially in the outer race such that a cavity is formed between the outer surface and the inner surface;
   a plurality of rolling elements disposed in the cavity and in rolling engagement with a portion of the inner surface and the outer surface; and
   a seal assembly secured to a portion of the outer race, the seal assembly comprising:
      an inner seal member comprising an annular ring having an axially inward facing surface and an axially outward facing surface, the annular ring having a first lobe extending outwardly from a radially outermost portion of the annular ring, the annular ring having a leg extending axially outward from the axially outward facing surface, proximate the first lobe, a seal receiving surface extending along a portion of the axially outward facing surface and along a radially inward facing surface of the leg, the seal receiving surface having a first seating area and a second seating area;
      an outer seal member positioned radially inward from the leg and axially outward from the axially outward facing surface of the annular ring, the outer seal member comprising a pivot member having a second lobe extending outwardly therefrom;
      a retaining ring having a circumferential groove formed therein, the retaining ring being positioned axially outward of the annular ring and radially inward from the leg; and
      the pivot member being pivotally seated in the groove so that the second lobe is moveable between the first seating area and the second seating area.

9. The track roller bearing of claim 8, wherein the retaining ring is configured to rotate with the inner race.

10. The track roller bearing of claim 8, further comprising at least one barrier for preventing introduction of a lubricant into the cavity when the track roller bearing is assembled.

11. The track roller bearing of claim 10, wherein the at least one barrier comprises:
   the outer surface extends continuously between the first axial end and the second axial end of the inner race and the outer surface extends circumferentially around the inner race; and
   the inner surface extends continuously between the third axial end and the fourth axial end of the outer race and the inner surface extends continuously circumferentially in the outer race.

12. The track roller bearing of claim 8, wherein at least one of the third axial end and the fourth axial end of the outer race comprises a radially inward facing groove in which the first lobe is seated such that the axially inward facing surface of the inner seal member frictionally engages the respective one of opposing axial faces of the outer race.

13. The track roller bearing of claim 8, wherein at least one of the third axial end and the fourth axial end of the outer race comprises a radially inward facing lip that engages a radially outward facing surface of the leg of the inner seal member to maintain a continuous circumferential engagement of the radially inward facing surface of the leg with the second lobe.

14. The track roller bearing of claim 8, wherein the seal receiving area comprises an arcuate segment.

15. The track roller bearing of claim 8, wherein the first lobe comprises a biasing property that is configured to align the annular ring in the bearing.

16. The track roller bearing of claim 8, wherein a portion of the retaining ring and a portion of the axially outward facing surface are in rotational sliding engagement with one another.

17. The track roller bearing of claim 8, wherein the second lobe is in rotational sliding engagement with a portion of the seal receiving surface.

18. The track roller bearing of claim 8, wherein a portion of the pivot member is in rotational sliding engagement with the groove.

19. The track roller bearing of claim 8, wherein at least one of the inner seal member and the outer seal member comprises a plastic material.

* * * * *